United States Patent
Sadacharam et al.

(10) Patent No.: US 12,430,859 B2
(45) Date of Patent: Sep. 30, 2025

(54) TESTING OF COLLABORATIVE MIXED REALITY OBJECTS

(71) Applicant: International Business Machines Corporation, Armonk, NY (US)

(72) Inventors: Saravanan Sadacharam, Chennai (IN); Arup Laha, Kolkata (IN); Vijay Ekambaram, Chennai (IN); Subhajit Bhuiya, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 18/382,272

(22) Filed: Oct. 20, 2023

(65) Prior Publication Data

US 2025/0131659 A1    Apr. 24, 2025

(51) Int. Cl.
*G06T 19/00*    (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| | | |
|---|---|---|
| 10,444,826 B2 | 10/2019 | Andersson |
| 11,080,939 B1 | 8/2021 | LaFranchi |
| 11,307,968 B2 | 4/2022 | Yerli |
| 11,928,047 B2 * | 3/2024 | Karri ............ G06N 5/01 |
| 2018/0308377 A1 | 10/2018 | Pena-Rios et al. |
| 2019/0107991 A1 | 4/2019 | Spivack et al. |
| 2020/0066049 A1 | 2/2020 | Sun et al. |
| 2023/0098596 A1 | 3/2023 | Karri et al. |

FOREIGN PATENT DOCUMENTS

| | | |
|---|---|---|
| CN | 113886663 A | 1/2022 |
| CN | 119862103 A | 4/2025 |

OTHER PUBLICATIONS

He et al., "Masked Autoencoders Are Scalable Vision Learners", arXiv:2111.06377, Dec. 19, 2021, 14 pages.

* cited by examiner

*Primary Examiner* — Robert J Craddock
(74) *Attorney, Agent, or Firm* — Steven M. Bouknight

(57) ABSTRACT

A method for testing and debugging interaction of collaborative mixed reality objects is disclosed. In one embodiment, such a method includes receiving inputs including a first mixed reality object expressed by a first set of attributes, a second mixed reality object expressed by a second set of attributes, a first individual test case associated with the first mixed reality object, and a second individual test case associated with the second mixed reality object. The method automatically generates, from the inputs, a collaborative mixed reality test case to evaluate interaction of the first mixed reality object with the second mixed reality object within a collaborative mixed reality environment. In certain embodiments, a generative-AI-based encoder-decoder architecture is used to generate the collaborative mixed reality test case from the inputs. A corresponding system and computer program product are also disclosed.

20 Claims, 12 Drawing Sheets

TESTING OF COLLABORATIVE MIXED REALITY OBJECTS

BACKGROUND

Field of the Invention

This invention relates generally to mixed reality environments and more specifically to systems and methods for testing and debugging the interaction of collaborative mixed reality objects originating from different sources.

Background of the Invention

A collaborative mixed reality (MR) environment is a digital space where multiple users may come together, whether in the same physical location or remotely, to interact and collaborate within a setting that combines elements of the physical world with virtual computer-generated information and objects. In such immersive environments, users typically wear mixed reality headsets or use mixed reality devices, allowing them to perceive and interact with both the real world and digital elements simultaneously. This technology may enable real-time collaboration among users, enabling them to engage with each other, manipulate virtual objects, and share information within a shared virtual space.

SUMMARY

The invention has been developed in response to the present state of the art and, in particular, in response to the problems and needs in the art that have not yet been fully solved by currently available systems and methods. Accordingly, systems and methods have been developed for testing and debugging interaction of collaborative mixed reality objects. The features and advantages of the invention will become more fully apparent from the following description and appended claims, or may be learned by practice of the invention as set forth hereinafter.

Consistent with the foregoing, a method for testing and debugging interaction of collaborative mixed reality objects is disclosed. In one embodiment, such a method includes receiving inputs including a first mixed reality object expressed by a first set of attributes, a second mixed reality object expressed by a second set of attributes, a first individual test case associated with the first mixed reality object, and a second individual test case associated with the second mixed reality object. The method automatically generates, from the inputs, a collaborative mixed reality test case to evaluate interaction of the first mixed reality object with the second mixed reality object within a collaborative mixed reality environment. In certain embodiments, a generative-AI-based encoder-decoder architecture is used to generate the collaborative mixed reality test case from the inputs.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
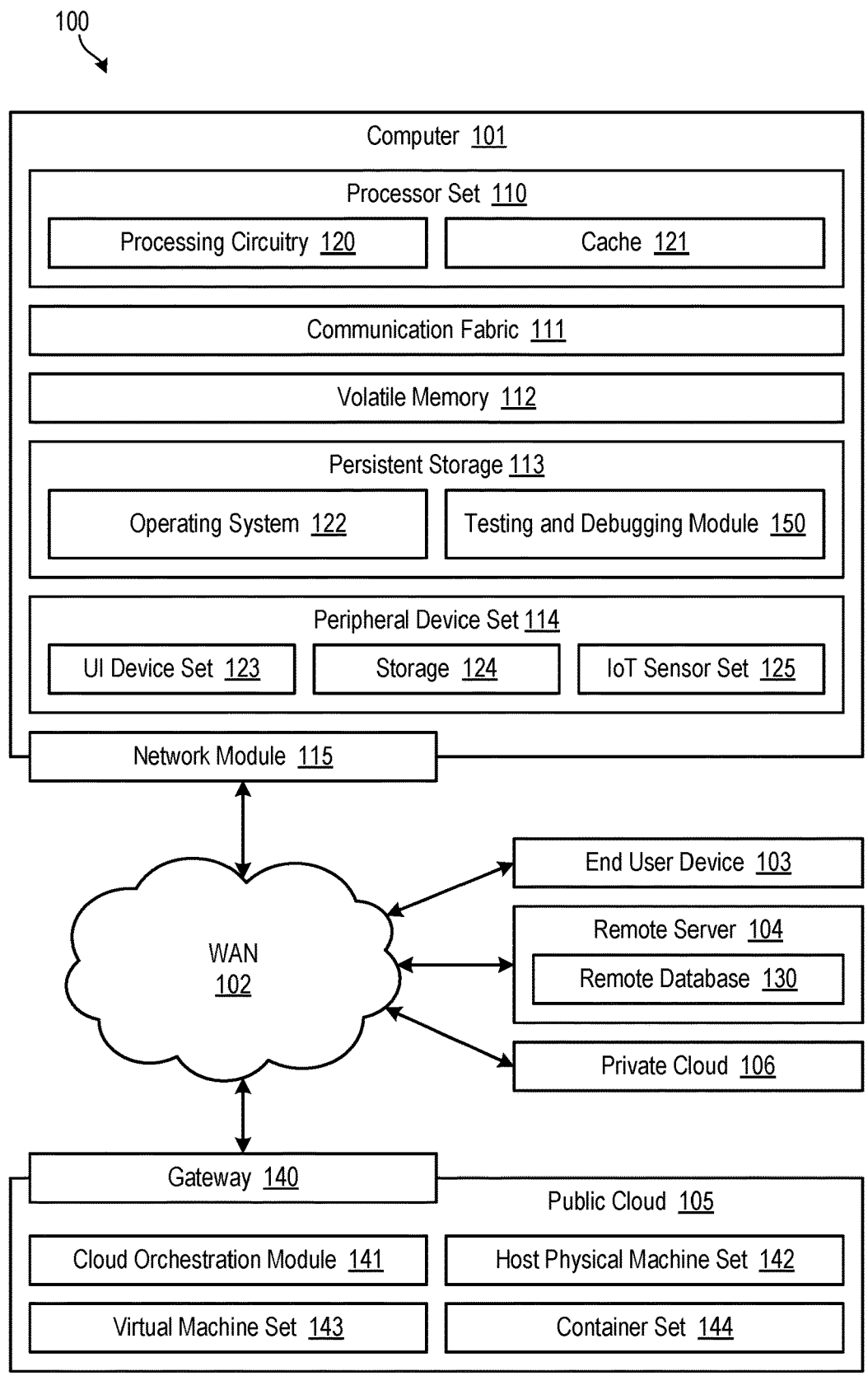
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., a "testing and debugging module 150") for testing and debugging the interaction of collaborative mixed reality objects. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
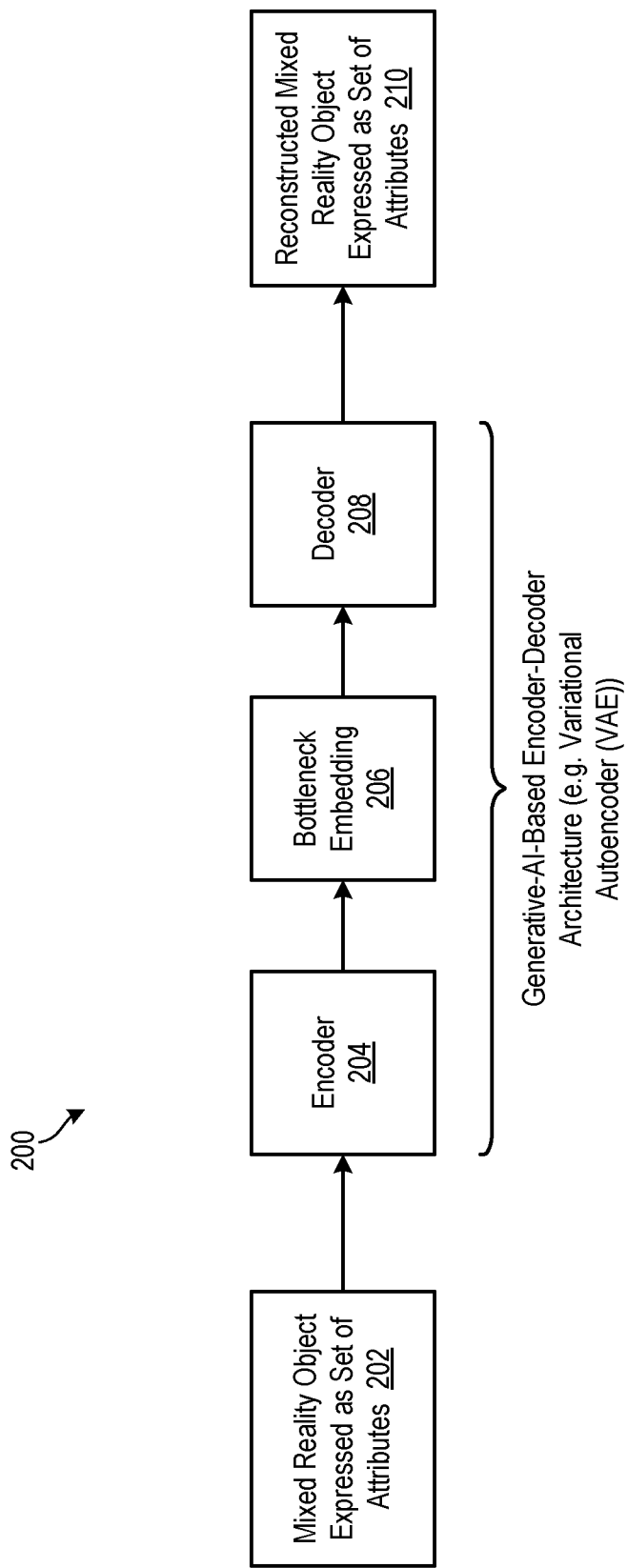
FIG. 2 is a high-level block diagram showing a method for training a generative-AI-based encoder-decoder architecture to capture an embedding of a mixed reality object.

Referring to FIG. 2, as previously mentioned, in collaborative mixed reality environments, objects from different sources may interact with one another to achieve a collaborative objective. These objects may have been developed and tested separately. Because interactions between these objects may be new and may not have been previously tested, their interactions may expose bugs or other undesired behavior that may require resolution. Currently, there is no established or agreed-upon testing framework for testing and debugging collaborative mixed reality objects originating from different sources.

In certain embodiments, a neural network, and more specifically a generative artificial-intelligence-based encoder-decoder architecture, may be trained to generate a collaborative mixed reality test case from various types of inputs. These inputs may include, for example, individual test cases for pairs of mixed reality objects as well as the mixed reality objects themselves expressed as a set of attributes. This collaborative mixed reality test case may be used to evaluate the interaction of the mixed reality objects in a collaborative mixed reality environment.

In general, mixed reality objects have various attributes that define their behavior and appearance in a mixed reality environment. These attributes may include one or more of location, scale, orientation, animation, interactivity, material, audio, and the like. For example, mixed reality objects can be placed in specific locations in the real world, and they can be anchored to real-world surfaces or remain free-floating. This allows users to interact with virtual objects in a specific location and provides a sense of presence and immersion. Mixed reality objects may also be sized and scaled to match the size and scale of real-world objects, enhancing the realism and immersion of the mixed reality experience. Mixed reality objects may be rotated and oriented in 3D space, allowing users to view them from different angles and perspectives. In certain cases, mixed reality objects may be animated to simulate real-world behavior such as movement, lighting, and particle effects. They may also be designed to respond to user interactions, such as hand gestures or controller inputs, thereby allowing users to manipulate and interact with the virtual objects in real-time. Mixed reality objects may also in certain cases be designed with a specific material, such as glass or metal, that defines their appearance and how they respond to lighting and shadows. They may also in certain cases be designed with audio effects, such as sound effects or voice, that enhance their behavior and appearance in a mixed reality environment.

Similarly, mixed reality objects can interact with one another in a variety of ways, depending on the specific mixed reality technology being used and the design of the mixed reality objects. For example, mixed reality objects may interact with one another by colliding or intersecting in 3D space. This can be used to simulate real-world interactions, such as objects bouncing off each other or blocking each other's movement. Mixed reality objects may also be constrained by each other such that their movement and/or behavior is linked in some way. For example, one mixed reality object may be attached to another so that it follows the movement of the other object. Mixed reality objects may also interact with one another by simulating physical forces, such as gravity, friction, and spring forces. This allows mixed reality objects to behave in realistic and intuitive ways and may be used to create complex interactions between mixed reality objects. In certain cases, mixed reality objects may interact with each other using audio, such as making sounds when they collide or react to each other in some way. In other cases, mixed reality objects may interact with one another by exchanging data, such as triggering an event or changing the behavior of one mixed reality object based on the state of another. Mixed reality objects may interact with one another by communicating over a network, such as exchanging data or triggering events between multiple devices. These represent just a few of the ways in which mixed reality objects may interact and is not intended to be limiting.

In order to use a neural network and more specifically a generative-AI-based encoder-decoder architecture to generate collaborative mixed reality test cases, the generative-AI-based encoder-decoder architecture may be trained with input data, also referred to herein as "training data." As mentioned above, mixed reality objects may have different attributes that may be used to classify the mixed reality objects. These attributes may provide one type of training data. Similarly, because mixed reality objects are typically separately developed and tested, the mixed reality objects will typically have their own test cases. These test cases may provide another type of training data. Furthermore, in a collaborative mixed reality environment, when mixed reality objects from different sources interact with one another, logs may be generated and stored describing the interaction. These logs may provide yet another type of training data.

FIG. 2 is a high-level block diagram showing an initial step of training a generative-AI-based encoder-decoder architecture to capture an embedding of a mixed reality object 202. As shown, the generative-AI-based encoder-decoder architecture 200 may receive as input a mixed reality object 202 expressed as a set of attributes. In this initial step, a variational autoencoder (VAE) may be trained to effectively capture a mixed reality object 202 in a gaussian embedding space. To accomplish this, the attributes of the mixed reality object 202 may be tokenized and fed to a VAE encoder 204 to generate a bottleneck embedding 206. This bottleneck embedding 206 may then be fed to a decoder 208 to reconstruct the original mixed reality object 202 expressed as a set of attributes. The VAE encoder 204 and decoder 208 may in certain embodiments utilize a multilayer perceptron (MLP) architecture. The VAE encoder 204 may be configured to minimize reconstruction loss and Kullback-Leibler (KL) divergence loss to ensure embedding in a gaussian distribution. Once the system is trained, the encoder 204 may be used to generate embeddings 206 for mixed reality objects and the decoder 208 may be ignored.

Figure 3:
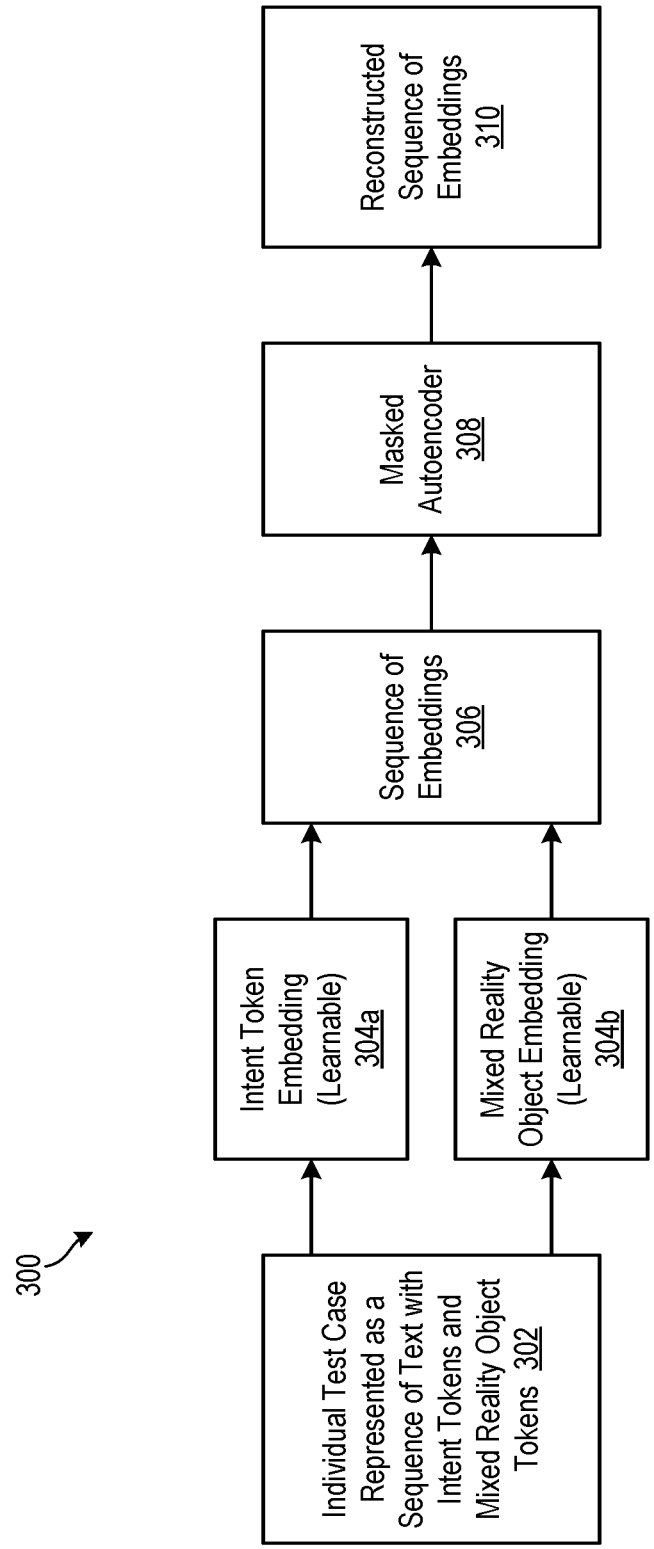
FIG. 3 is a high-level block diagram showing a method for training a generative-AI-based encoder-decoder architecture to capture an embedding for an individual test case of a mixed reality object.

FIG. 3 is a high-level block diagram showing a next step of training a generative-AI-based encoder-decoder architecture to capture an embedding for an individual test case of a mixed reality object 202. In this step, an individual test case 302 may be represented as sequence of intent tokens 304a and mixed reality object tokens 304b which may then be converted to embeddings 306 via a learnable embedding layer. The system 300 may in certain embodiments use the encoder 202 described in association with FIG. 2 as the embedding layer for mixed reality objects to capture attribute correlations. The system 300 may use a masked autoencoder 308 that masks some percentage (e.g., 75 percent) of the tokens 304 which the encoder and decoder may then reconstruct at box 310. The masked autoencoder 308 may be built on top of transformers and be powerful enough to capture cross channel correlations. By enabling mask token generalization, the system 300 may learn better and more compact generalized representations of a test case. The encoder of the masked autoencoder 308 may be used to get the test-case embedding. A normal distribution may be enforced in the encoder space for latter sampling requirements.

Figure 4:
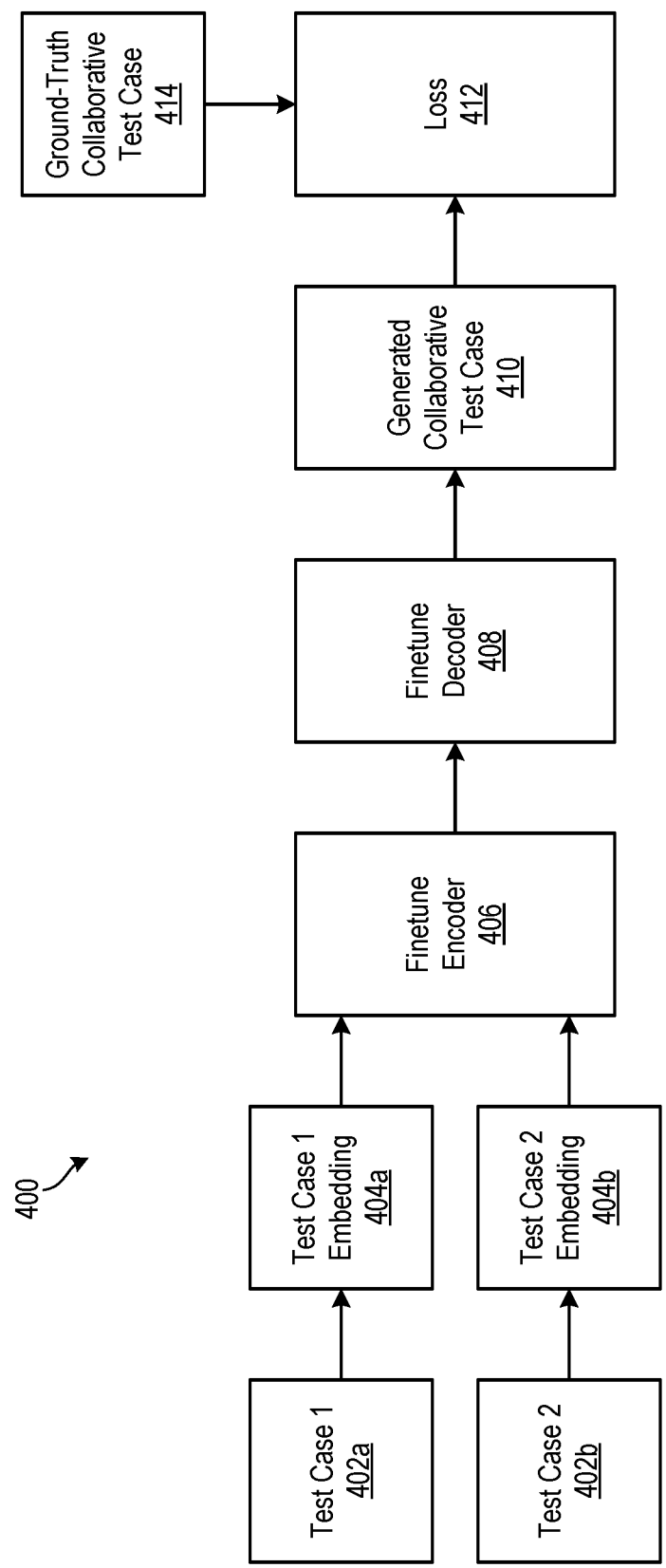
FIG. 4 is a high-level block diagram showing a method for training a generative-AI-based encoder-decoder architecture to generate collaborative mixed reality test cases.

FIG. 4 is a high-level block diagram showing a next step of training a generative-AI-based encoder-decoder architecture to generate collaborative mixed reality test cases. Once test-case embeddings are learned by the training described in association with FIG. 3, a simple supervised finetuning approach may be followed. When provided two individual test cases 402a, 402b, the system 400 may generate a collaborative test case 410. Ground-truth collaborative test cases 414 may be used for this training to minimize loss 412 (e.g., cross-entropy or softmax loss) and train the model. A finetune encoder 406 receives embeddings 404a, 404b for the two test cases 402a, 402b and a finetune decoder 408 generates a raw generated collaborative test case 410 from the embedding space. Finetune decoder weights may be initialized from a mean absolute error (MAE) decoder where the embedding space is constrained to be in a normal distribution. This enables the finetune decoder 408 to effectively sample and generate new collaborative test cases 410 from the embedding space. The end-to-end process is trained in a supervised setting to finetune to the problem under interest.

Figure 5:
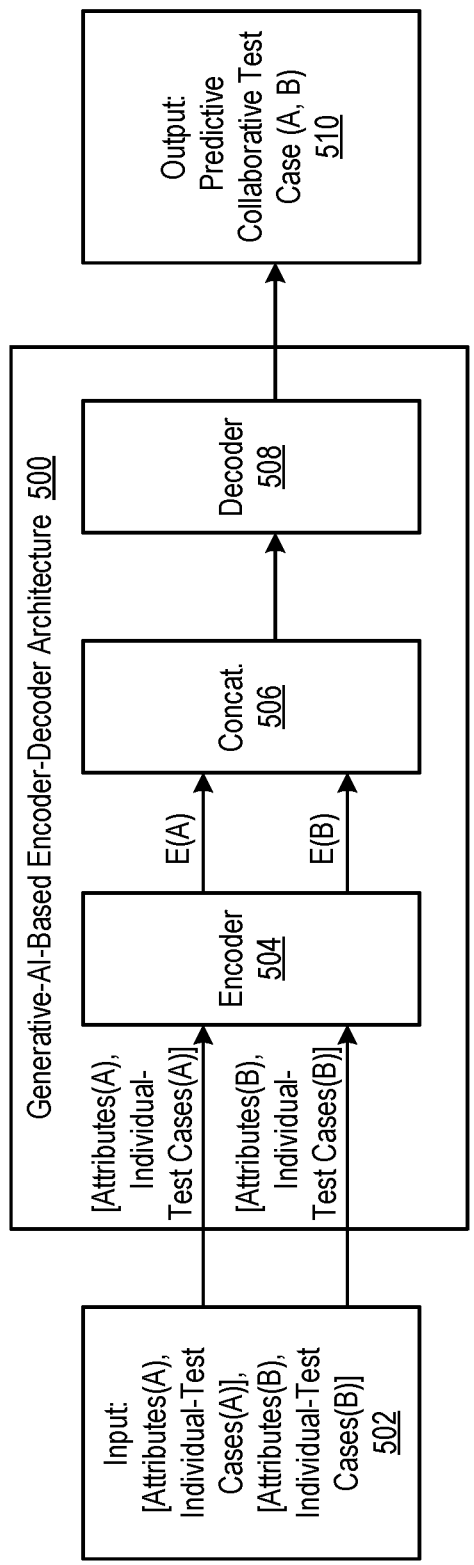
FIG. 5 is a high-level block diagram showing a generative-AI-based encoder-decoder architecture configured to output a predicted collaborative mixed reality test case when receiving a pair of mixed reality objects expressed as a set of attributes, and individual test cases associated with the mixed reality objects.

FIG. 5 provides a general overview of a generative-AI-based encoder-decoder architecture 500 after training has been performed and the generative-AI-based encoder-decoder architecture has been put into inference or predictive mode. As shown, the generative-AI-based encoder-decoder architecture 500 is configured to output a predicted collaborative mixed reality test case 510 when receiving a pair of mixed reality objects 502 (A and B) expressed as a set of attributes, and individual test cases 502 associated with the mixed reality objects 502. As shown, the encoder 504 outputs embeddings (E(A) and E(B)) for each of the mixed reality objects 502 and associated individual test cases. These embeddings may be concatenated and passed to the decoder 508 in order to generate and predict a collaborative mixed reality test case (A, B) 510.

Figure 6:
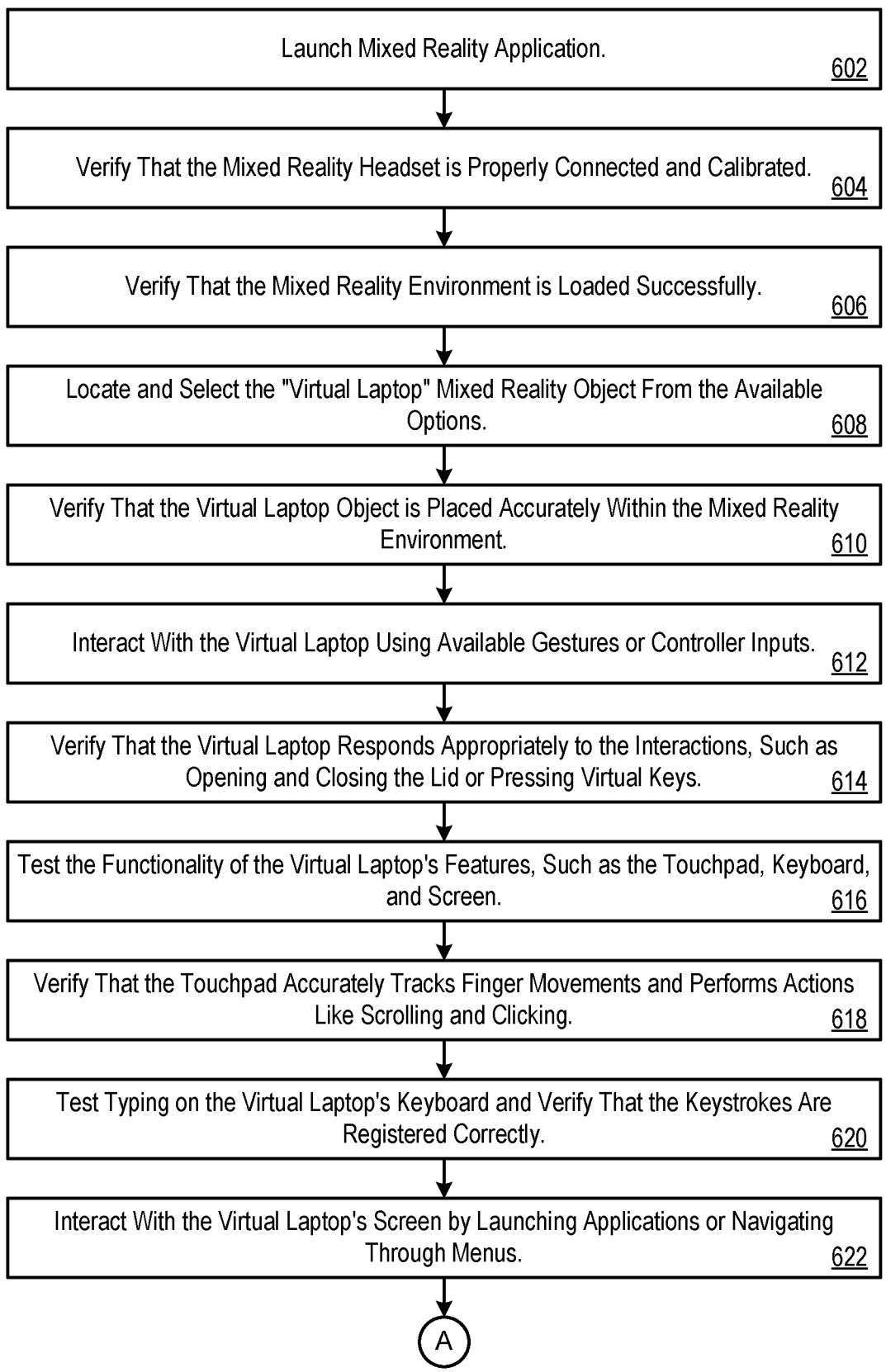
FIGS. 6 and 7 show an example of an individual test case for a first mixed reality object, in this example a virtual laptop.
Figure 7:
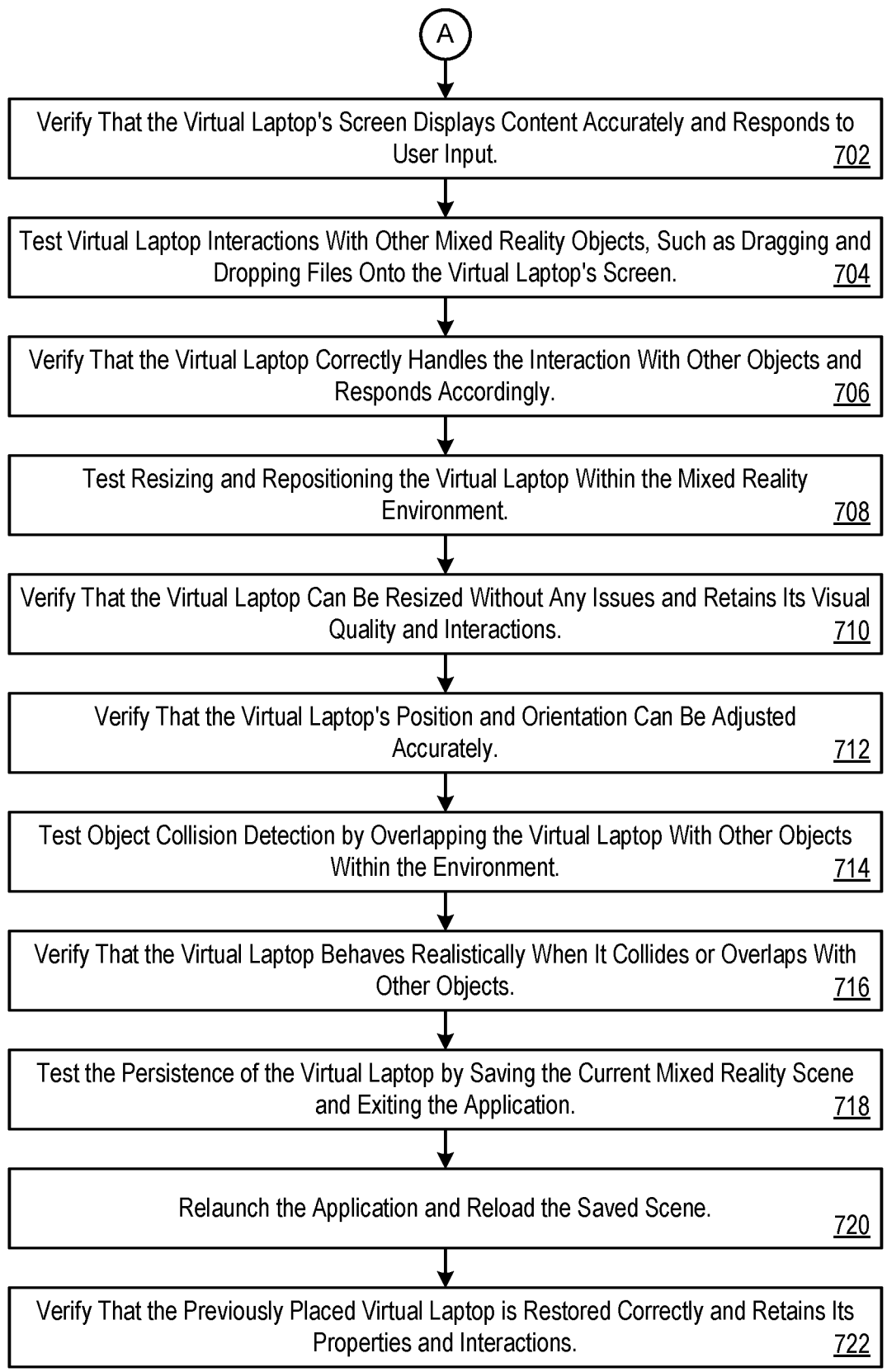
Figure 8:
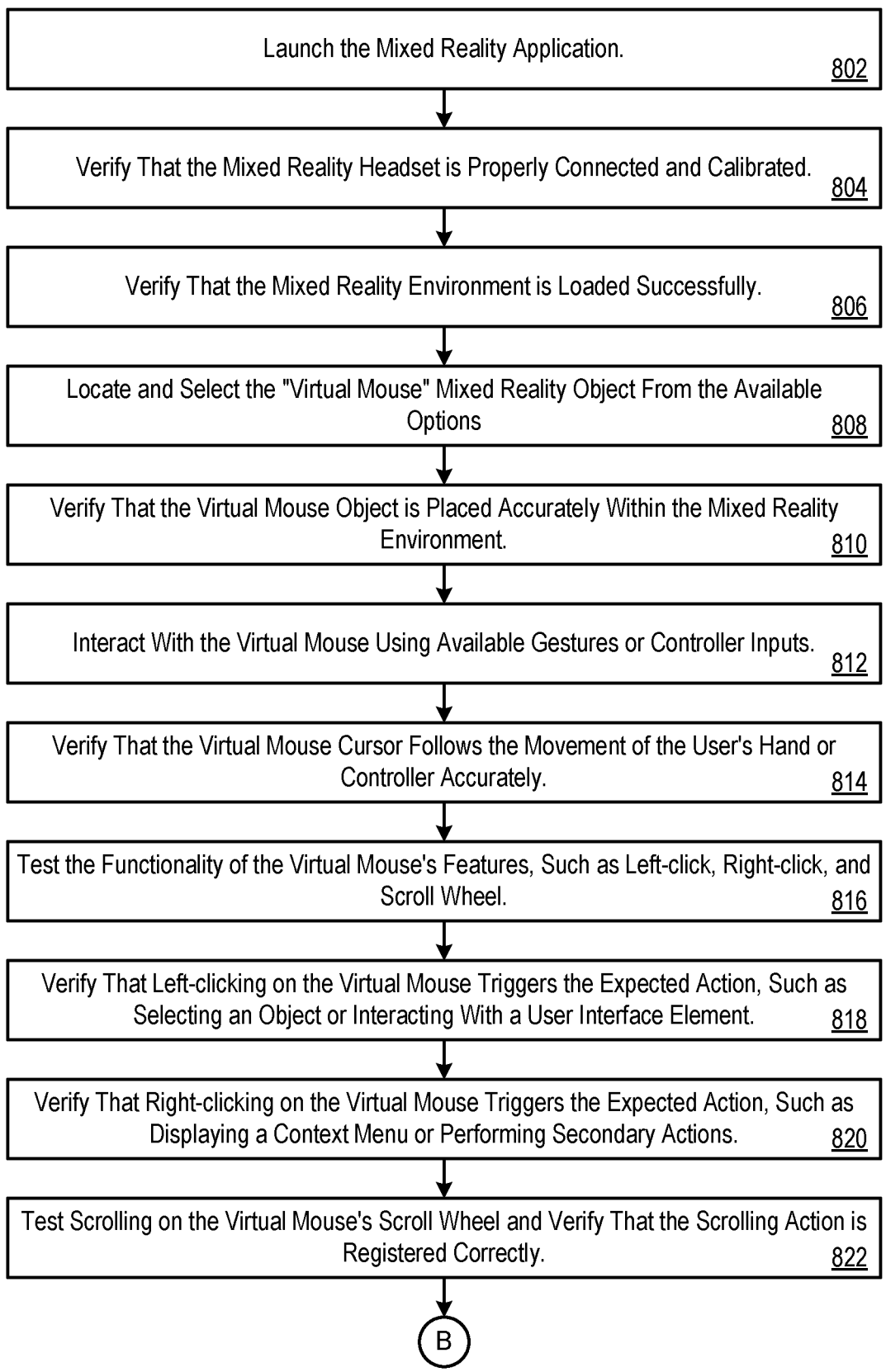
FIGS. 8 and 9 show an example of an individual test case for a second mixed reality object, in this example a virtual mouse.
Figure 9:
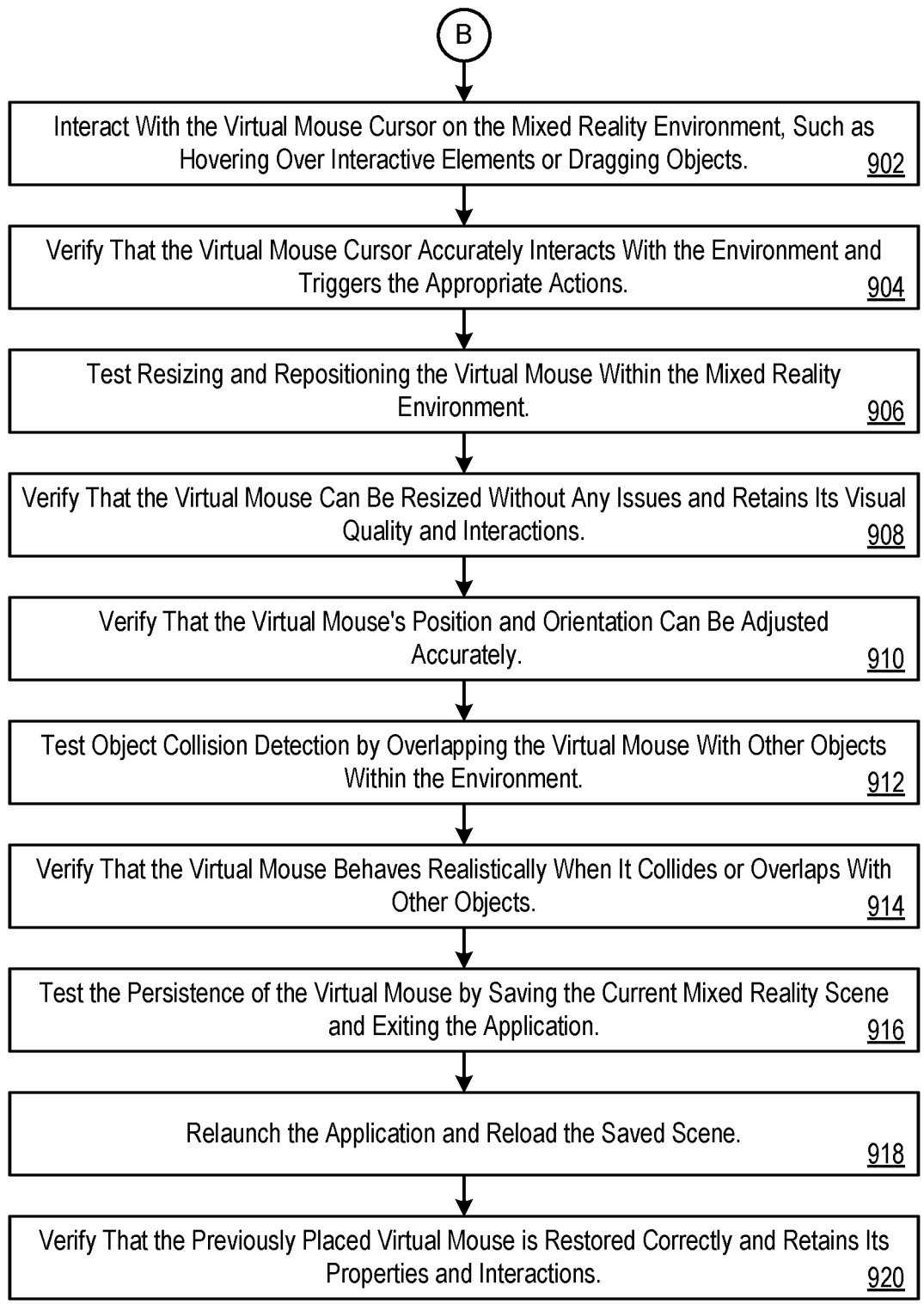
Figure 10:
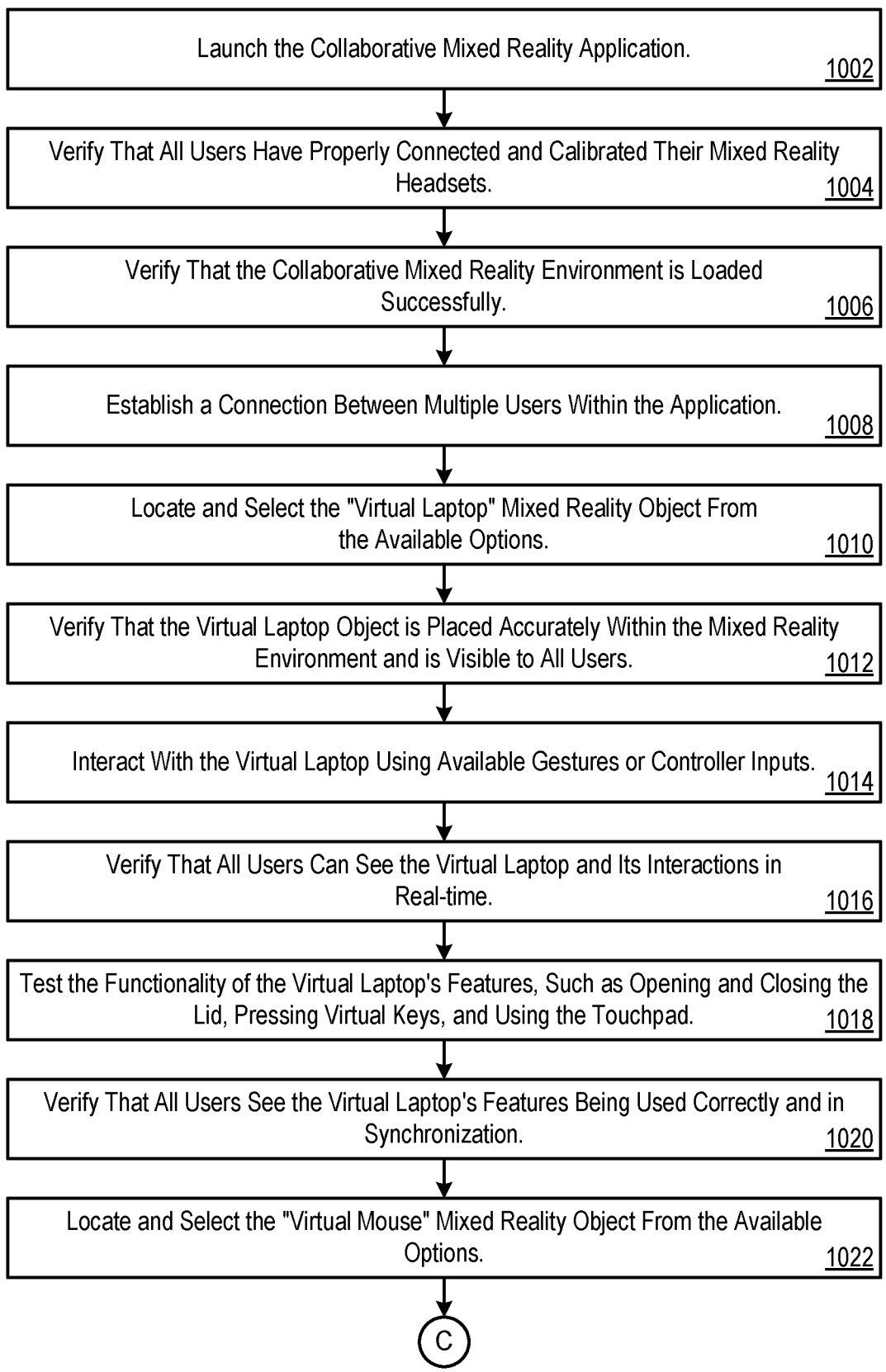
FIG. 10 through 12 show an example of collaborative mixed reality test case for evaluating interaction between the virtual laptop and the virtual mouse described in FIGS. 6 through 9.
Figure 11:
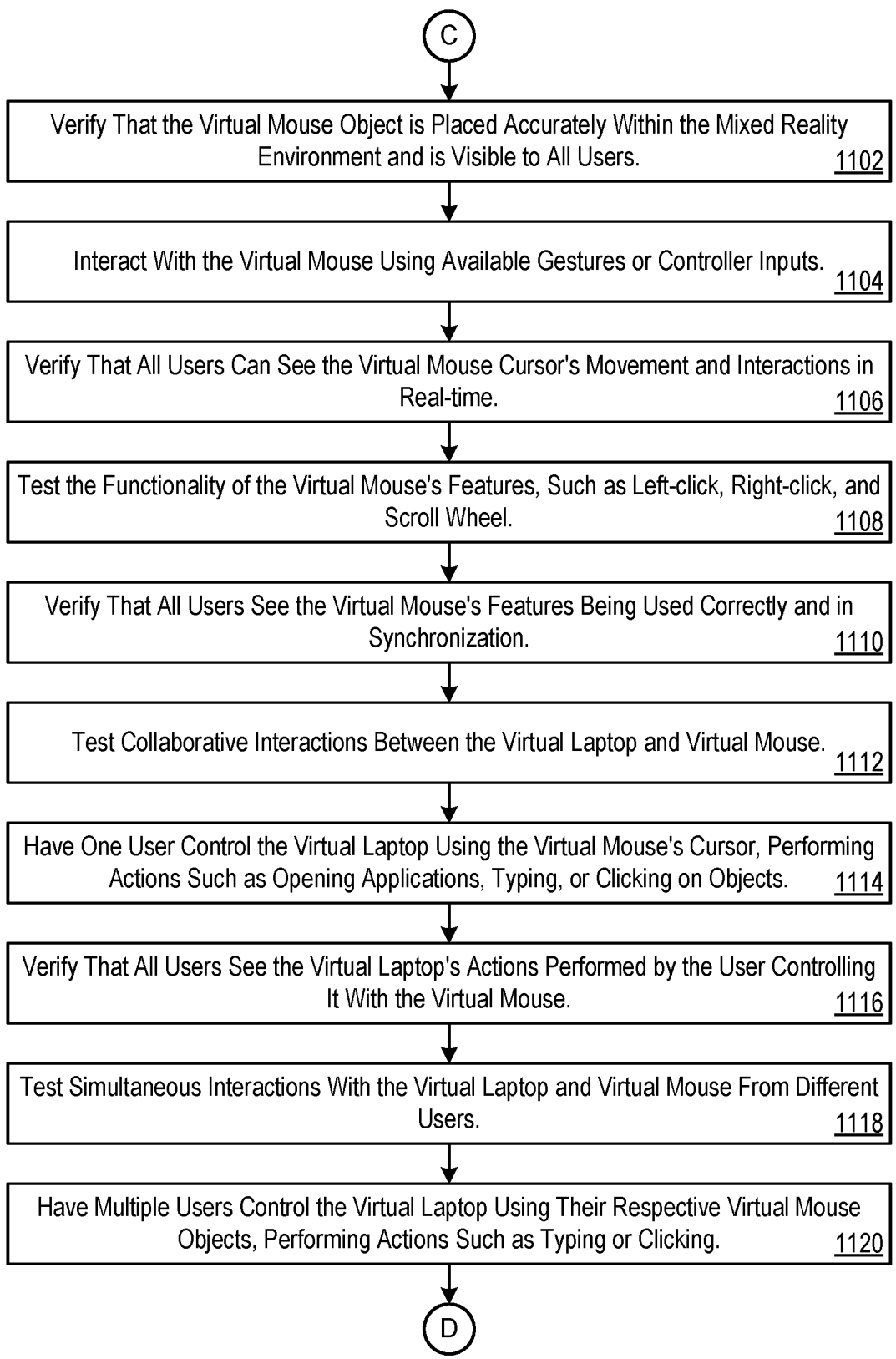
Figure 12:
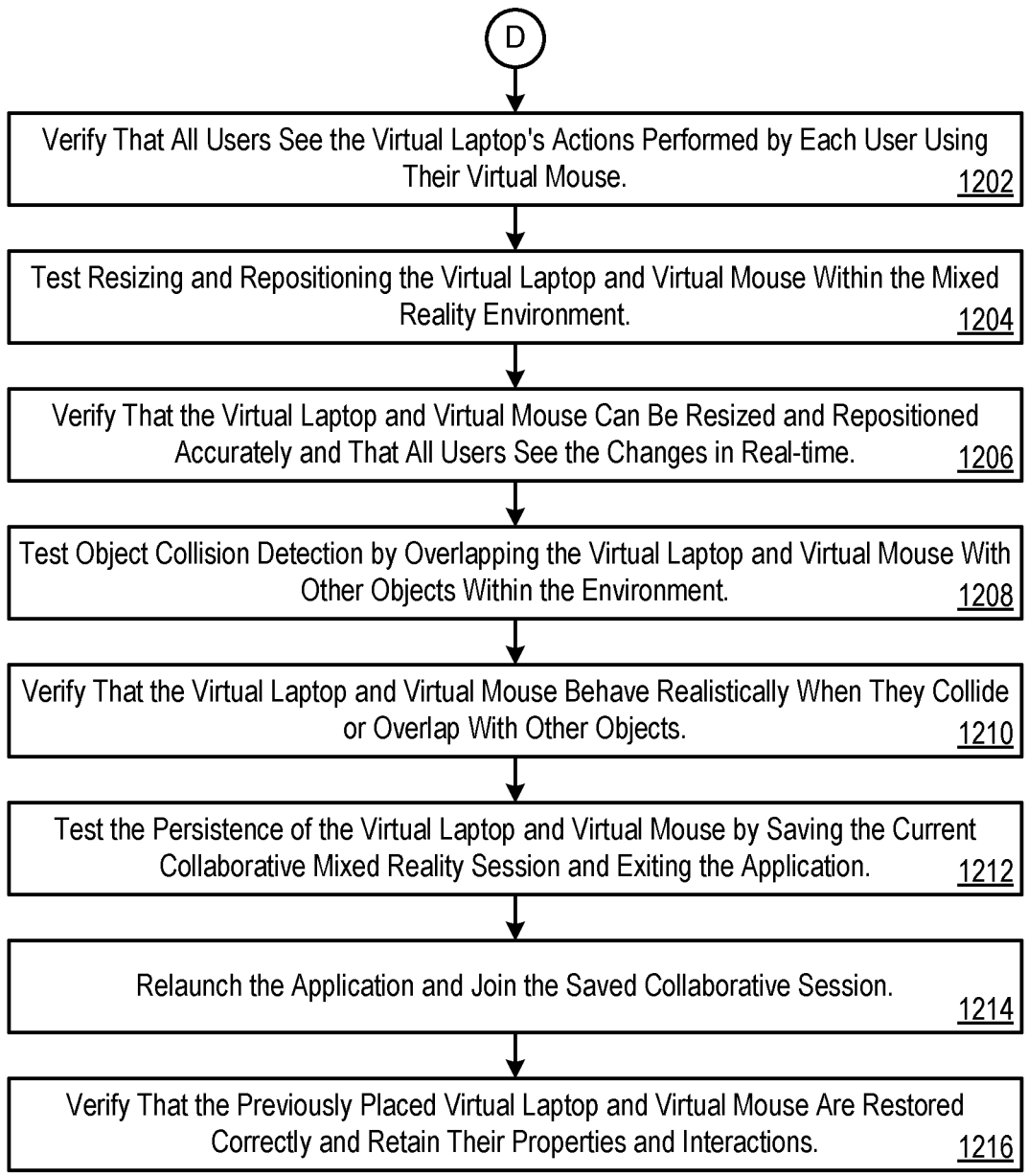

Referring to FIGS. 6-12, an example is provided of two mixed reality objects and associated individual test cases that are used to generate a collaborative mixed reality test case for evaluating the interaction of the mixed reality objects. In this example, the first mixed reality object is a virtual laptop and the second mixed reality object is a virtual mouse. These mixed reality objects may have been developed and tested separately. The generated collaborative mixed reality test case may be used to evaluate the interaction of the virtual laptop with the virtual mouse to determine or predict whether they will operate correctly with one another. FIGS. 6 and 7 show an exemplary individual test case for the virtual laptop; FIGS. 8 and 9 show an exemplary individual test case for the virtual mouse; and FIG. 10 through 12 show an exemplary collaborative mixed reality test case for evaluating interaction between the virtual laptop and the virtual mouse.

Referring to FIGS. 6 and 7, to verify the functionality and interaction of a virtual laptop mixed reality object within a mixed reality environment, an individual test case for the virtual laptop may include the following: launch 602 a mixed reality application; verify 604 that a mixed reality headset is properly connected and calibrated; verify 606 that the mixed reality environment is loaded successfully; locate 608 and select 608 a "Virtual Laptop" mixed reality object from the available options; verify 610 that the virtual laptop object is placed accurately within the mixed reality environment; interact 612 with the virtual laptop using available gestures or controller inputs; verify 614 that the virtual laptop responds appropriately to the interactions, such as opening and closing the lid or pressing virtual keys; test 616 functionality of the virtual laptop's features, such as the touchpad, keyboard, and screen; verify 618 that the touchpad accurately tracks finger movements and performs actions like scrolling and clicking; test 620 typing on the virtual laptop's keyboard and verify that the keystrokes are registered correctly; interact 622 with the virtual laptop's screen by launching applications or navigating through menus; verify 702 that the virtual laptop's screen displays content accurately and responds to user input; test 704 virtual laptop interactions with other mixed reality objects, such as dragging and dropping files onto the virtual laptop's screen; verify 706 that the virtual laptop correctly handles the interaction with other objects and responds accordingly; test 708 resizing and repositioning the virtual laptop within the mixed reality environment; verify 710 that the virtual laptop can be resized without any issues and retains its visual quality and interactions; verify 712 that the virtual laptop's position and orientation can be adjusted accurately; test 714 object collision detection by overlapping the virtual laptop with other objects within the environment; verify 716 that the virtual laptop behaves realistically when it collides or overlaps with other objects; test 718 the persistence of the virtual laptop by saving the current mixed reality scene and exiting the application; relaunch 720 the application and reload the saved scene; and verify 722 that the previously placed virtual laptop is restored correctly and retains its properties and interactions.

The expected results for the individual test case of the virtual laptop may include the following: the virtual laptop mixed reality object should be accurately placed within the mixed reality environment; the virtual laptop should respond appropriately to interactions, such as opening and closing the lid or pressing virtual keys; the touchpad on the virtual laptop should accurately track finger movements and perform actions like scrolling and clicking; typing on the virtual laptop's keyboard should register keystrokes correctly; the virtual laptop's screen should display content accurately and respond to user input; interactions with other mixed reality objects, such as dragging and dropping files, should be handled correctly by the virtual laptop; resizing and repositioning the virtual laptop should work without any issues and retain its visual quality and interactions; the virtual laptop should behave realistically when colliding or overlapping with other objects; and saved mixed reality scenes should restore the previously placed virtual laptop correctly, including its properties and interactions.

Referring to FIGS. 8 and 9, to verify the functionality and interaction of a virtual mouse mixed reality object within a mixed reality environment, an individual test case for the virtual mouse may include the following: launch 802 a mixed reality application; verify 804 that a mixed reality headset is properly connected and calibrated; verify 806 that the mixed reality environment is loaded successfully; locate 808 and select the "Virtual Mouse" mixed reality object from the available options; verify 810 that the virtual mouse object is placed accurately within the mixed reality environment; interact 812 with the virtual mouse using available gestures or controller inputs; verify 814 that the virtual mouse cursor follows the movement of a user's hand or controller accurately; test 816 the functionality of the virtual mouse's features, such as left-click, right-click, and scroll wheel; verify 818 that left-clicking on the virtual mouse triggers the expected action, such as selecting an object or interacting with a user interface element; verify 820 that right-clicking on the virtual mouse triggers the expected action, such as displaying a context menu or performing secondary actions; test 822 scrolling on the virtual mouse's scroll wheel and verify that the scrolling action is registered correctly; interact 902 with the virtual mouse cursor on the mixed reality environment, such as hovering over interactive elements or dragging objects; verify 904 that the virtual mouse cursor accurately interacts with the environment and triggers the appropriate actions; test 906 resizing and repositioning the virtual mouse within the mixed reality environment; verify 908 that the virtual mouse can be resized without any issues and retains its visual quality and interactions; verify 910 that the virtual mouse's position and orientation can be adjusted accurately; test 912 object collision detection by overlapping the virtual mouse with other objects within the environment; verify 914 that the virtual mouse behaves realistically when it collides or overlaps with other objects; test 916 the persistence of the virtual mouse by saving the current mixed reality scene and exiting the application; relaunch 918 the application and reload the saved scene; and verify 920 that the previously placed virtual mouse is restored correctly and retains its properties and interactions.

The expected results for the individual test case of the virtual mouse may include the following: the virtual muse mixed reality object should be accurately placed within the mixed reality environment; the virtual mouse cursor should follow the movement of the user's hand or controller accurately; left-clicking on the virtual mouse should trigger the expected action; right-clicking on the virtual mouse should trigger the expected action; scrolling on the virtual mouse's scroll wheel should register the scrolling action correctly; the virtual mouse cursor should accurately interact with the mixed reality environment and trigger the appropriate actions; resizing and repositioning the virtual mouse should work without any issues and retain its visual quality and interactions; the virtual mouse should behave realistically when colliding or overlapping with other objects; and saved mixed reality scenes should restore the previously placed virtual mouse correctly, including its properties and interactions.

Referring to FIGS. 10 through 12, to verify the functionality and interaction between the previously discussed virtual laptop and virtual mouse within a collaborative mixed reality environment, a collaborative mixed reality test case may be generated as follows: launch 1002 a collaborative mixed reality application; verify 1004 that all users have properly connected and calibrated their mixed reality headsets; verify 1006 that the collaborative mixed reality environment is loaded successfully; establish 1008 a connection between multiple users within the application; locate 1010 and select the "Virtual Laptop" mixed reality object from the available options; verify 1012 that the virtual laptop object is placed accurately within the mixed reality environment and is visible to all users; interact 1014 with the virtual laptop using available gestures or controller inputs; verify 1016 that all users can see the virtual laptop and its interactions in real-time; test 1018 the functionality of the virtual laptop's features, such as opening and closing the lid, pressing virtual keys, and using the touchpad; verify 1020 that all users see the virtual laptop's features being used correctly and in synchronization; locate 1022 and select the "Virtual Mouse" mixed reality object from the available options; verify 1102 that the virtual mouse object is placed accurately within the mixed reality environment and is visible to all users; interact 1104 with the virtual mouse using available gestures or controller inputs; verify 1106 that all users can see the virtual mouse cursor's movement and interactions in real-time; test 1108 the functionality of the virtual mouse's features, such as left-click, right-click, and scroll wheel; verify 1010 that all users see the virtual mouse's features being used correctly and in synchronization; test 1112 collaborative interactions between the virtual laptop and virtual mouse; have 1114 one user control the virtual laptop using the virtual mouse's cursor, performing actions such as opening applications, typing, or clicking on objects; verify 1116 that all users see the virtual laptop's actions performed by the user controlling it with the virtual mouse; test 1118 simultaneous interactions with the virtual laptop and virtual mouse from different users; have 1120 multiple users control the virtual laptop using their respective virtual mouse objects, performing actions such as typing or clicking; verify 1202 that all users see the virtual laptop's actions performed by each user using their virtual mouse; test 1204 resizing and repositioning the virtual laptop and virtual mouse within the mixed reality environment; verify 1206 that the virtual laptop and virtual mouse can be resized and repositioned accurately and that all users see the changes in real-time; test 1208 object collision detection by overlapping the virtual laptop and virtual mouse with other objects within the environment; verify 1210 that the virtual laptop and virtual mouse behave realistically when they collide or overlap with other objects; test 1212 the persistence of the virtual laptop and virtual mouse by saving the current collaborative mixed reality session and exiting the application; relaunch 1214 the application and join the saved collaborative session; and verify 1216 that the previously placed virtual laptop and virtual mouse are restored correctly and retain their properties and interactions.

The expected results for the individual test case of the virtual mouse may include the following: multiple users should be able to interact with the virtual laptop and virtual mouse simultaneously and see real-time updates; the virtual laptop should respond appropriately to interactions, such as opening and closing the lid or pressing virtual keys, performed by the user controlling it with the virtual mouse; the virtual mouse cursor should accurately follow the movement of the user's hand or controller and interact with the mixed reality environment; collaborative interactions between the virtual laptop and virtual mouse, performed by different users, should be synchronized and visible to all users; resizing and repositioning the virtual laptop and virtual mouse should work without any issues and retain their visual quality and interactions; the virtual laptop and virtual mouse should behave realistically when colliding or overlapping with other objects; saved collaborative sessions should restore the previously placed virtual laptop and virtual mouse correctly, including their properties and interactions.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for testing and debugging interaction of collaborative mixed reality objects, the method comprising:
    receiving inputs comprising a first mixed reality object expressed by a first set of attributes, a second mixed reality object expressed by a second set of attributes, a first individual test case associated with the first mixed reality object, and a second individual test case associated with the second mixed reality object; and
    automatically generating, from the inputs, a collaborative mixed reality test case to evaluate interaction of the first mixed reality object with the second mixed reality object within a collaborative mixed reality environment.

2. The method of claim 1, wherein automatically generating comprises automatically generating using a generative-AI-based encoder-decoder architecture.

3. The method of claim 2, further comprising training the generative-AI-based encoder-decoder architecture using at least one of attributes of mixed reality objects, individual test cases of mixed reality objects, and collaboration logs of mixed reality objects in collaborative mixed reality environments.

4. The method of claim 2, wherein the inputs are concatenated prior to input to the generative-AI-based encoder-decoder architecture.

5. The method of claim 2, wherein the first and second mixed reality objects are developed and tested separately prior to input to the generative-AI-based encoder-decoder architecture.

6. The method of claim 1, wherein the first mixed reality object and the second mixed reality object originate from different sources.

7. The method of claim 1, wherein the first and second sets of attributes comprise at least one of physical and meta attributes.

8. A computer program product for testing and debugging interaction of collaborative mixed reality objects, the computer program product comprising a computer-readable storage medium having computer-usable program code embodied therein, the computer-usable program code configured to perform the following when executed by at least one processor:
    receive inputs comprising a first mixed reality object expressed by a first set of attributes, a second mixed reality object expressed by a second set of attributes, a first individual test case associated with the first mixed reality object, and a second individual test case associated with the second mixed reality object; and
    automatically generate, from the inputs, a collaborative mixed reality test case to evaluate interaction of the first mixed reality object with the second mixed reality object within a collaborative mixed reality environment.

9. The computer program product of claim 8, wherein automatically generating comprises automatically generating using a generative-AI-based encoder-decoder architecture.

10. The computer program product of claim 9, wherein the computer-usable program code is further configured to train the generative-AI-based encoder-decoder architecture using at least one of attributes of mixed reality objects, individual test cases of mixed reality objects, and collaboration logs of mixed reality objects in collaborative mixed reality environments.

11. The computer program product of claim 9, wherein the inputs are concatenated prior to input to the generative-AI-based encoder-decoder architecture.

12. The computer program product of claim 9, wherein the first and second mixed reality objects are developed and tested separately prior to input to the generative-AI-based encoder-decoder architecture.

13. The computer program product of claim 8, wherein the first mixed reality object and the second mixed reality object originate from different sources.

14. The computer program product of claim 8, wherein the first and second sets of attributes comprise at least one of physical and meta attributes.

15. A system for testing and debugging interaction of collaborative mixed reality objects, the system comprising:
    at least one processor;
    at least one memory device operably coupled to the at least one processor and storing instructions for execution on the at least one processor, the instructions causing the at least one processor to:
        receive inputs comprising a first mixed reality object expressed by a first set of attributes, a second mixed reality object expressed by a second set of attributes, a first individual test case associated with the first mixed reality object, and a second individual test case associated with the second mixed reality object; and
        automatically generate, from the inputs, a collaborative mixed reality test case to evaluate interaction of the first mixed reality object with the second mixed reality object within a collaborative mixed reality environment.

16. The system of claim 15, wherein automatically generating comprises automatically generating using a generative-AI-based encoder-decoder architecture.

17. The system of claim 16, wherein the instructions further cause the at least one processor to train the generative-AI-based encoder-decoder architecture using at least one of attributes of mixed reality objects, individual test cases of mixed reality objects, and collaboration logs of mixed reality objects in collaborative mixed reality environments.

18. The system of claim 16, wherein the inputs are concatenated prior to input to the generative-AI-based encoder-decoder architecture.

19. The system of claim 16, wherein the first and second mixed reality objects are developed and tested separately prior to input to the generative-AI-based encoder-decoder architecture.

20. The system of claim 15, wherein the first mixed reality object and the second mixed reality object originate from different sources.

\* \* \* \* \*